United States Patent
Adams et al.

(10) Patent No.: US 9,372,732 B2
(45) Date of Patent: *Jun. 21, 2016

(54) DATA PROCESSING WORK ALLOCATION

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/751,464

(22) Filed: Jun. 26, 2015

(65) Prior Publication Data

US 2015/0293791 A1    Oct. 15, 2015

Related U.S. Application Data

(63) Continuation of application No. 13/780,496, filed on Feb. 28, 2013, now Pat. No. 9,110,722.

(51) Int. Cl.
　　G06F 9/46　　(2006.01)
　　G06F 9/50　　(2006.01)
　　G06F 9/48　　(2006.01)

(52) U.S. Cl.
　　CPC ............ G06F 9/5027 (2013.01); G06F 9/4856 (2013.01); G06F 9/5088 (2013.01)

(58) Field of Classification Search
　　None
　　See application file for complete search history.

(56) References Cited

U.S. PATENT DOCUMENTS 5,664,179 A    9/1997   Tucker
5,689,620 A    11/1997  Kopec et al.
(Continued)

FOREIGN PATENT DOCUMENTS

EP    1566752 A2    8/2005
EP    1843259 A2    10/2007
(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(Continued)

*Primary Examiner* — Van Nguyen
(74) *Attorney, Agent, or Firm* — John R. Pivnichny; Law Office of Jim Boice

(57) ABSTRACT

A method, system, and/or computer program product allocates computer processing work. One or more processors identify: an input data that is stored in a first computer for processing by a computer program; a virtual machine, stored in a second computer, that is capable of executing the computer program; a first set of constraint rules against moving the input data from the first computer; and a second set of constraint rules against moving the virtual machine from the second computer. The one or more processors assign a weight to each constraint rule, and sum the weight of all constraint rules that are applicable. In response to the first total constraint rule weight exceeding the second total constraint rule weight, movement of the input data from the first computer to the second computer is prohibited and the virtual machine is moved from the second computer to the first computer.

20 Claims, 3 Drawing Sheets

(56) References Cited

U.S. PATENT DOCUMENTS

| | | | |
|---|---|---|---|
| 5,701,460 A | 12/1997 | Kaplan et al. |
| 5,974,427 A | 10/1999 | Reiter |
| 6,167,405 A | 12/2000 | Rosensteel et al. |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,353,818 B1 | 3/2002 | Carino, Jr. |
| 6,553,371 B2 | 4/2003 | Gutierrez-Rivas et al. |
| 6,633,868 B1 | 10/2003 | Min et al. |
| 6,768,986 B2 | 7/2004 | Cras et al. |
| 6,802,062 B1 | 10/2004 | Oyamada et al. |
| 7,019,740 B2 | 3/2006 | Georgalas |
| 7,047,253 B1 | 5/2006 | Murthy et al. |
| 7,058,628 B1 | 6/2006 | Page |
| 7,152,070 B1 | 12/2006 | Musick et al. |
| 7,191,183 B1 | 3/2007 | Goldstein |
| 7,203,944 B1 | 4/2007 | van Rietschote et al. |
| 7,257,811 B2 | 8/2007 | Hunt et al. |
| 7,337,174 B1 | 2/2008 | Craig |
| 7,383,405 B2 | 6/2008 | Vega et al. |
| 7,441,264 B2 | 10/2008 | Himmel et al. |
| 7,484,208 B1 | 1/2009 | Nelson |
| 7,523,118 B2 | 4/2009 | Friedlander et al. |
| 7,523,123 B2 | 4/2009 | Yang et al. |
| 7,571,163 B2 | 8/2009 | Trask |
| 7,607,129 B2 | 10/2009 | Rosu et al. |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,904,540 B2 | 3/2011 | Hadad et al. |
| 7,925,923 B1 | 4/2011 | Hyser et al. |
| 7,930,262 B2 | 4/2011 | Friedlander et al. |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,112,527 B2 | 2/2012 | Kawato |
| 8,141,075 B1 | 3/2012 | Chawla et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,156,490 B2 | 4/2012 | Bozek et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,296,329 B1 | 10/2012 | Das |
| 8,316,125 B2 | 11/2012 | DeHaan |
| 8,341,626 B1 | 12/2012 | Gardner et al. |
| 8,423,646 B2 | 4/2013 | Jamjoom et al. |
| 8,447,273 B2 | 5/2013 | Friedlander et al. |
| 8,776,050 B2 | 7/2014 | Plouffe et al. |
| 8,914,789 B2 | 12/2014 | Barros et al. |
| 2001/0051881 A1 | 12/2001 | Filler |
| 2002/0111792 A1 | 8/2002 | Cherny |
| 2002/0184401 A1 | 12/2002 | Kadel et al. |
| 2003/0088576 A1 | 5/2003 | Hattori et al. |
| 2003/0149562 A1 | 8/2003 | Walther |
| 2003/0212664 A1 | 11/2003 | Breining et al. |
| 2004/0153461 A1 | 8/2004 | Brown et al. |
| 2004/0162838 A1 | 8/2004 | Murayama et al. |
| 2005/0050030 A1 | 3/2005 | Gudbjartsson et al. |
| 2005/0188088 A1 | 8/2005 | Fellenstein et al. |
| 2006/0004851 A1 | 1/2006 | Gold et al. |
| 2006/0190195 A1 | 8/2006 | Watanabe et al. |
| 2006/0271586 A1 | 11/2006 | Federighi et al. |
| 2007/0006321 A1 | 1/2007 | Bantz et al. |
| 2007/0174840 A1 | 7/2007 | Sharma et al. |
| 2007/0185850 A1 | 8/2007 | Walters et al. |
| 2007/0282916 A1 | 12/2007 | Albahari et al. |
| 2007/0300077 A1 | 12/2007 | Mani et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0125546 A1 | 5/2009 | Iborra et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0070640 A1 | 3/2010 | Allen et al. |
| 2010/0088322 A1 | 4/2010 | Chowdhury et al. |
| 2010/0131293 A1 | 5/2010 | Linthicum et al. |
| 2010/0179933 A1 | 7/2010 | Bai et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246498 A1 | 10/2011 | Forster |
| 2011/0301967 A1 | 12/2011 | Friedlander et al. |
| 2011/0314155 A1 | 12/2011 | Narayanaswamy et al. |
| 2012/0016715 A1 | 1/2012 | Brown et al. |
| 2012/0023141 A1 | 1/2012 | Holster |
| 2012/0079493 A1 | 3/2012 | Friedlander et al. |
| 2012/0131139 A1 | 5/2012 | Siripurapu et al. |
| 2012/0131468 A1 | 5/2012 | Friedlander et al. |
| 2012/0191704 A1 | 7/2012 | Jones |
| 2012/0221439 A1 | 8/2012 | Sundaresan et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0124564 A1 | 5/2013 | Oztekin et al. |
| 2013/0173585 A1 | 7/2013 | Friedlander et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

Evaggelio Pitoura et al., "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

(56) References Cited

OTHER PUBLICATIONS

Visual Paradigm, "DB Visual Architect 4.0 Designer's Guide: Chapter 6—Mapping Object Model to Data Model and Vice Versa", 2007, pp. 6-2-6-26.
"Fraud Detection Using Data Analytics in the Banking Industry," ACL Services Ltd., 2010, pp. 1-9 <http://www.acl.com/pdfs/DP_Fraud_detection_BANKING.pdf>.
W. Caid et al., "Context Vector-Based Text Retrieval", Fair ISAAC Corporation, Aug. 2003, pp. 1-20.
K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.
U.S. Appl. No. 13/342,305, Friedlander et al.—Specification filed Jan. 3, 2012.
Richard Saling, "How to Give a Great Presentation! From the HP Learning Center", Jul. 28, 2008, <http://rsaling.wordpress.com/2008/07/28/how-to-give-a-great-presentation/>, pp. 1-28.
U.S. Appl. No. 12/890,309—Non-Final Office Action Mailed Jun. 14, 2012.
U.S. Appl. No. 12/890,309—Notice of Allowance Mailed Nov. 30, 2012.
L. Haas et al., "IBM Federated Database Technology", IBM Developer Works Library, Mar. 1, 2002, pp. 1-10.
M. Lurie, "The Federation-Database Interoperability", IBM Developer Works Library, Apr. 24, 2003, pp. 1-15.
P. Mell et al., "The NIST Definition of Cloud Computing", National Institute of Standards and Technology, Information Technology Laboratory, Sep. 2011, pp. 1-7.
U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/592,905—Non-Final Office Action Mailed May 8, 2013.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/562,714, Robert R. Friedlander, et al.—Specification and Drawings filed Jul. 31, 2012.
M. J. Flynn, et al., "Sparse Distributed Memory Principles of Operation", Research Institute for Advanced Computer Science, 1989, pp. 1-60.
P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.
P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.
A. Jin, et al., "Biohashing: Two Factor Authentication Featuring Fingerprint Data and Tokenised Random Number," Pattern Recognition 37, Elsevier Ltd., 2004, pp. 2245-2255.
N. Saxena et al., "Data remanence effects on memory-based entropy collection for RFID systems", International Journal of Information Security 10.4 (2011), pp. 213-222.
A. Birrell et al., "A design for high-performance flash disks." ACM SIGOPS Operating Systems Review 41.2 (2007), pp. 88-93.
U.S. Appl. No. 13/592,905—Notice of Allowance Mailed Oct. 25, 2013.
U.S. Appl. No. 13/628,853—Non-Final Office Action Mailed Nov. 7, 2013.
Piao et al., "A Network-Aware Virtual Machine Placement and Migration Approach in Cloud Computing", 2010 IEEE, pp. 87-92.
Celesti et al., "Improving Virtual Machine Migration in Federated Cloud Environments", 2010 IEEE, pp. 61-67.
Versick et al., "Reducing Energy Consumption by Load Aggregation with an Optimized Dynamic Live Migration of Virtual Machines", 2010 IEEE, pp. 164-170.
Mishra et al., "Dynamic Resource Management Using Virtual Machine Migrations", 2012 IEEE, pp. 34-40.
Xiao et al., "A Priority Based Scheduling Strategy for Virtual Machine Allocation in Cloud Computing Environment", 2012 IEEE, pp. 50-55.
U.S. Appl. No. 13/780,496—Notice of Allowance mailed Mar. 30, 2015.

DATA PROCESSING WORK ALLOCATION

BACKGROUND

The present disclosure relates to the field of computers, and specifically to the use of computers in data processing. Still more particularly, the present disclosure relates to allocating data processing jobs to appropriate resources according to constraint rules.

A data processing job is defined as the execution of instructions within a software application. These instructions manipulate input data to produce output data from the software application. Typically, such instruction execution is performed using data that is locally stored on a computer.

SUMMARY

A method, system, and/or computer program product allocates computer processing work. One or more processors identify: an input data that is stored in a first computer for processing by a computer program; a virtual machine, stored in a second computer, that is capable of executing the computer program; a first set of constraint rules against moving the input data from the first computer; and a second set of constraint rules against moving the virtual machine from the second computer. The one or more processors assign a weight to each constraint rule within the first set of constraint rules and the second set of constraint rules, and identify which one or more constraint rules within the first set of constraint rules applies to the input data and which one or more constraint rules within the second set of constraint rules applies to the virtual machine. The processor(s) sum the weight of all constraint rules that apply to the input data to generate a first total constraint rule weight, and sum the weight of all constraint rules that apply to the virtual machine to generate a second total constraint rule weight. In response to the first total constraint rule weight exceeding the second total constraint rule weight, movement of the input data from the first computer to the second computer is prohibited and the one or more processors move the virtual machine from the second computer to the first computer.

DETAILED DESCRIPTION

Figure 1:
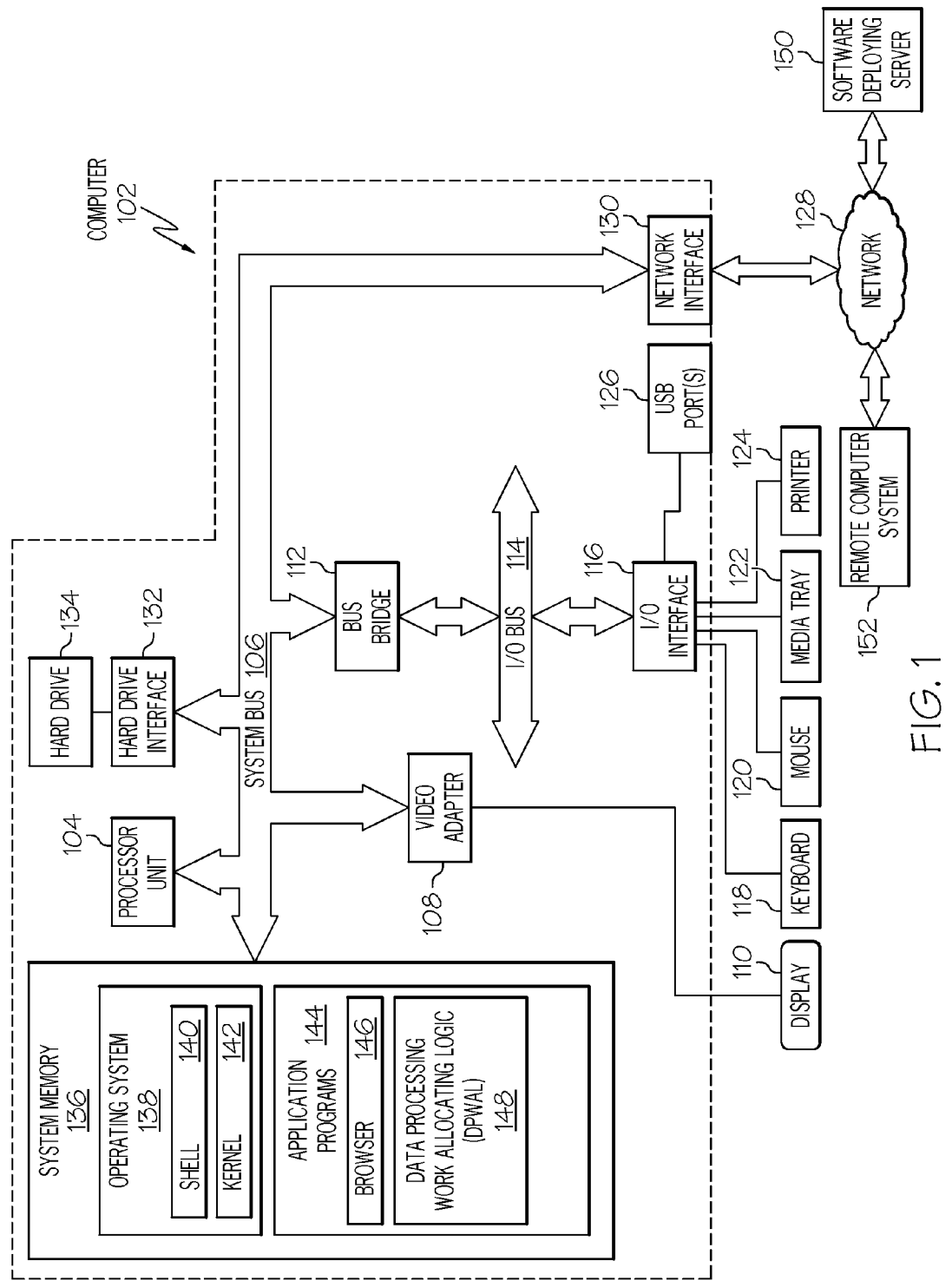
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

In one embodiment, instructions are stored on a computer readable storage device (e.g., a CD-ROM), which does not include propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or remote computer system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or remote computer system 152 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a data processing work allocating logic (DPWAL) 148. DPWAL 148 includes code for implementing the processes described below, including those described in FIGS. 2-3. In one embodiment, computer 102 is able to download DPWAL 148 from software deploying server 150, including in an on-demand basis, wherein the code in DPWAL 148 is not downloaded until needed for execution. Note further that, in one embodiment of the present invention, software deploying server 150 performs all of the functions associated with the present invention (including execution of DPWAL 148), thus freeing computer 102 from having to use its own internal computing resources to execute DPWAL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
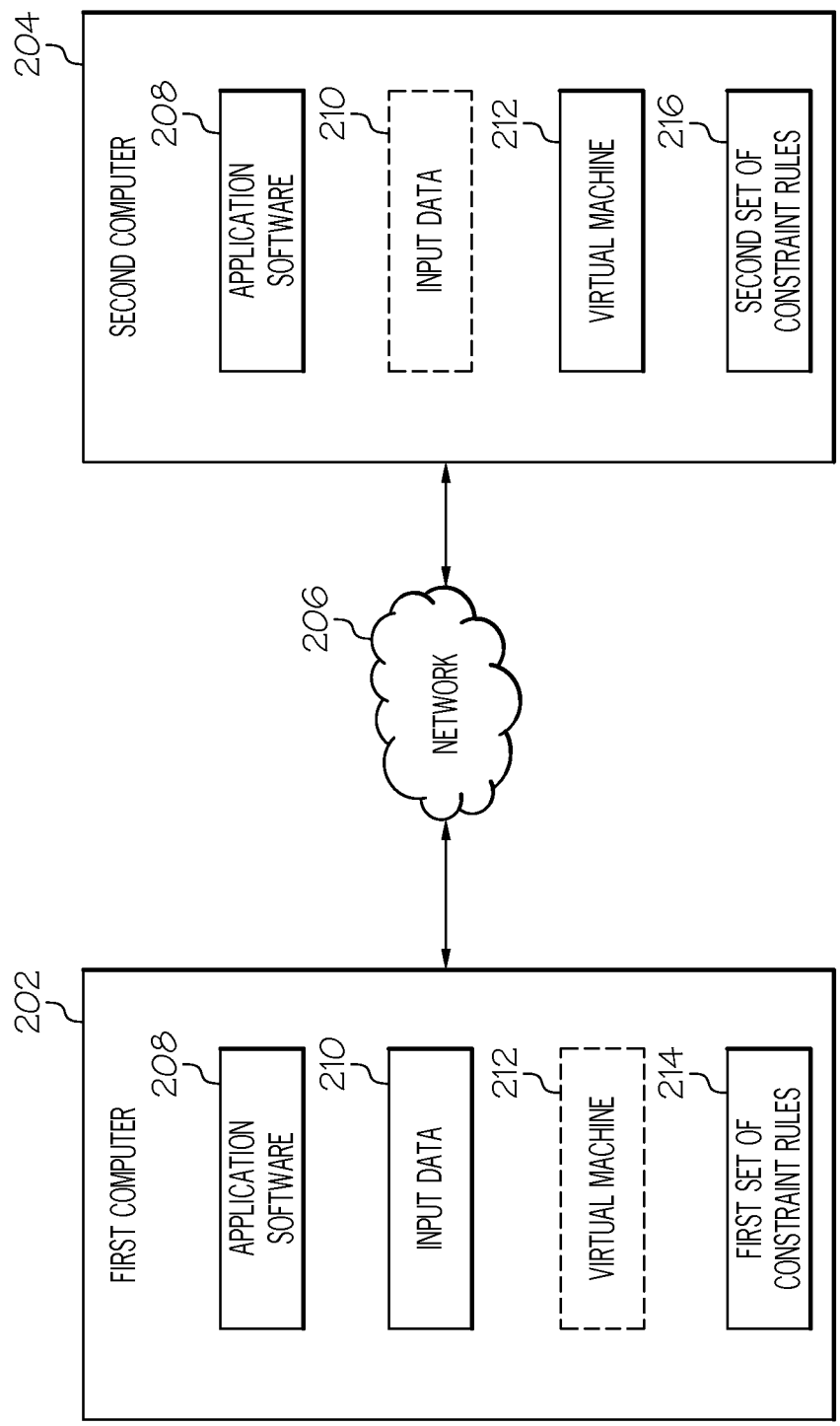
FIG. 2 illustrates additional details of a computing network according to an embodiment of the present invention.

With reference now to FIG. 2, details of a computing system 200 according to an embodiment of the present invention is presented. A first computer 202 (e.g., remote computer system 152 shown in FIG. 1) communicates with a second computer 204 (e.g., computer system 102 shown in FIG. 1) via a network 206 (e.g., network 128 shown in FIG. 1). Both the first computer 202 and the second computer 204 have a copy of an application software 208, which is designed to run on a virtual machine in order to process input data 210. Initially, however, the first computer 202 does not have a copy of the requisite virtual machine 212 that is needed to run the application software 208 using the input data 210 as inputs to the application software 208. Similarly, the second computer 204 does not initially have the requisite input data 210 that needs to be processed by the virtual machine 212 executing the application software 208.

As known to those skilled in the art, a "virtual machine" is a software simulation of a computer, which may be an actual computer or a hypothetical computer. That is, software presents input/output interfaces that allow data to be input into the software simulation, and output to be generated by the software simulation, in a manner that exactly mimics a real computer. Of course, the simulation software executes on a real machine, but the user and/or data interface are unaware of the underlying real machine, since all interactions are with the virtual machine rather than the underlying real machine.

In one embodiment, the virtual machine is a system virtual machine, which supports execution of a complete operating system. In an embodiment of the present invention, the virtual machine is a process virtual machine, which is designed to run a single software application, thus supporting a single process. In either embodiment, the virtual machine is a software-implemented duplicate of a real machine.

As mentioned above and depicted in FIG. 2, initially the second computer 204 has the requisite application software 208 and virtual machine 212, but does not have a copy of the necessary input data 210. Before sending the input data 210 from the first computer 202 to the second computer 204, however, there must be a review of constraint rules with a first set of constraint rules 214. The first set of constraint rules 214 contains constraint rules that determine whether or not the input data 210 may be moved out of the first computer 202, and if such movement is prohibited (or at least restricted), to what degree. For example, assume that input data 210 is health data that, due to statutory proscriptions, may not exit the first computer 202 unless certain steps are taken (e.g., the health data is properly encrypted, truncated, etc.). If the input data 210 has not complied with this statutory requirement, then the input data 210 cannot migrate to the second computer 204 for execution.

Similarly, the second set of constraint rules 216 sets guidelines (constraint rules) for moving the virtual machine 212 out of the second computer 204. For example, a constraint rule may state that, due to the proprietary (i.e., secret of an enterprise) nature of the virtual machine 212, it is not allowed to run on any computer outside of the second computer 204. In another example, a constraint rule may state that the virtual machine 212 may not be sent to any system whose hardware is unable to run the virtual machine 212 at or above certain benchmark levels. That is, even though the virtual machine 212 may function using a low-end processor, it will likely run at a very reduced level, thus harming the reputation of the creator/provider of the virtual machine 212.

Note that constraint rules from the first set of constraint rules 214 and the second set of constraint rules 216 may be weighted according to their significance. For example, consider the first set of constraint rules 214. A first constraint rule from these constraint rules may be related to prohibiting transmission of input data 210 from the first computer 202 to the second computer 204 during certain times of the day, in order to conserve transmission bandwidth in network 206 during those times. A second constraint rule from the first set of constraint rules 214 may be related to prohibiting the transmission of health data unless the health data complies with statutory regulations. The second constraint rule is probably more important than the first constraint rule, and thus is weighted more heavily.

Consider now the second set of constraint rules 216. A third constraint rule from these constraint rules may be related to prohibiting transmission of virtual machine 212 from the second computer 204 to the first computer 202 unless that first computer 202 belongs to an enterprise that has been a customer (of the entity that created the virtual machine 212) for more than one year. A fourth constraint rule from the second set of constraint rules 216 may be related to transmitting the virtual machine 212 to locations that are restricted due to trade barriers. The fourth constraint rule is probably more important than the third constraint rule, and thus is weighted more heavily.

In one embodiment, a decision to move the input data 210 from the first computer 202 to the second computer 204, or to move the virtual machine 212 from the second computer 204 to the first computer 202, is based on the relative weightings of the applicable constraint rules. For example, assume that the first and second constraint rules from the first set of constraint rules 214 are applicable to the input data 210, and the third and fourth constraint rules from the second set of constraint rules 216 are applicable to the virtual machine 212. Assume also the following weights that have been assigned to these constraint rules, as shown in Table I:

TABLE I

| | WEIGHT OF FIRST CON- STRAINT RULE | WEIGHT OF SECOND CON- STRAINT RULE | WEIGHT OF THIRD CON- STRAINT RULE | WEIGHT OF FOURTH CON- STRAINT RULE | COM- BINED (SUM- MED) WEIGHT |
|---|---|---|---|---|---|
| FIRST SET OF CON- STRAINT RULES | 5.7 | 6.3 | | | 12.0 |
| SECOND SET OF CON- STRAINT RULES | | | 5.2 | 7.9 | 13.1 |

As depicted, the combined/summed weight of the constraint rules (third and fourth constraint rules) from the second set of constraint rules (13.1) is greater than the combined/summed weight of the constraint rules (first and second constraint rules) from the first set of constraint rules (12.0). Therefore, assuming that the weighting factors are on a same scale of predetermined overall significance within the first set of constraint rules 214 and the second set of constraint rules, there is a greater weighted prohibition against moving the virtual machine 212 than moving the input data 210. Thus, the decision is made by operation logic (e.g., DPWAL 148 in FIG. 1) to move the input data 210 from the first computer 202 to the second computer 204 rather than moving the virtual machine 212 from the second computer 204 to the first computer 202.

Figure 3:
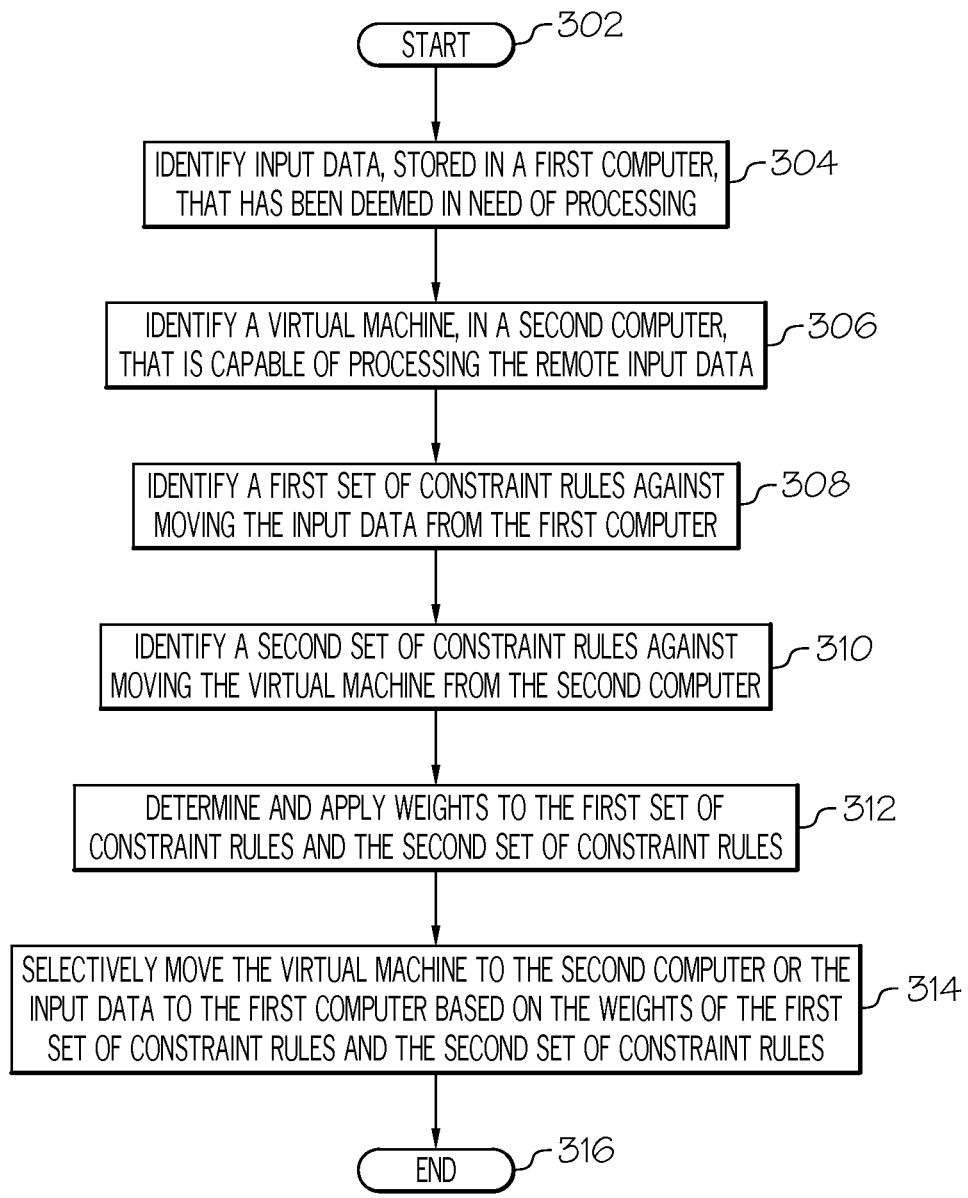
FIG. 3 is a high-level flow chart of one or more steps performed by one or more processors to allocate software processing work to particular components of a computing network according to constraints on the particular components and/or data being processed thereon.

Referring now to FIG. 3, a high-level flow chart of one or more steps performed by one or more processors to allocate software processing work to particular components of a computing network according to constraints on the particular components and/or data being processed thereon is presented. After initiator block 302, one or more processors identify an input data that has been deemed to be in need of processing (block 304). In one embodiment, this deeming/determination is based on a review of an overall system, in which the input data is processable by a computer program (e.g., application software 208 depicted in FIG. 2), has been generated from outputs of other programs, readings from sensors, etc., and now needs to be evaluated/processed/examined. As described herein, the input data is stored in a first computer (e.g., first computer 204 shown in FIG. 2).

As described in block 306, one or more processors then identifies a virtual machine (e.g., virtual machine 212 depicted in FIG. 2) that is capable of executing the computer program. This virtual machine is stored in a second computer, such as the second computer 202 depicted in FIG. 2.

As described in block 308, one or more processors identifies a first set of constraint rules (e.g., element 214 shown in FIG. 2) against moving the input data from the first computer. As described in block 310, one or more processors also identifies a second set of constraint rules (e.g., element 216 shown in FIG. 2) against moving the virtual machine from the second computer. That is, the first set of constraint rules describes conditions that 1) must be met before the input data is permitted to be moved outside of the first computer, particularly (in one embodiment) movement of the input data from the first computer to the second computer; or that 2) prohibit the movement of the input data from the first computer whenever these conditions exist. Similarly, the second set of constraint rules describes conditions that 1) must be met before the virtual machine is permitted to be moved outside of the second computer, particularly (in one embodiment) movement of the virtual machine from the second computer to the first computer; or that 2) prohibit the movement of the virtual machine from the second computer whenever these conditions exist.

In an exemplary embodiment in which the first set of constraint rules controls how the input data will be handled, one or more processors determines that at least one constraint rule from the first set of constraint rules absolutely prohibits moving the input data from the first computer. For example, assume that the input data is data that is classified "Top Secret". In this example, there may be a constraint rule stating that, no matter what other circumstances/conditions/situations exist, the input data can never be moved outside of the first computer. In this scenario, in response to determining that the at least one constraint rule from the first set of constraint rules absolutely prohibits moving the input data from the first computer, the virtual machine is moved to the first computer, since the input data cannot be moved from the first computer to the second computer.

In an exemplary embodiment in which the second set of constraint rules controls how and where the virtual machine is used, one or more processors may determine that hardware resources in the first computer are incapable of supporting the virtual machine found in the second computer. In this example, a constraint rule from the second set of constraint rules prohibits movement of the virtual machine from the second computer to the first computer, and thus the input data is moved from the first computer to the second computer.

As described in block 312, one embodiment of the present invention determines and applies weights to constraint rules in the first and second sets of constraint rules. That is, one or more processors assigns a weight to each constraint rule within the first set of constraint rules and the second set of constraint rules. One or more processors identifies which one or more constraint rules within the first set of constraint rules applies to the input data and which one or more constraint rules within the second set of constraint rules applies to the virtual machine. One or more processors then sums the weight of all constraint rules that apply to the input data to generate a first total constraint rule weight, as well as the weight of all constraint rules that apply to the virtual machine to generate a second total constraint rule weight. In response to the first total constraint rule weight exceeding the second total constraint rule weight, one or more processors then prohibit movement of the input data from the first computer to the second computer and move the virtual machine from the second computer to the first computer. Alternatively, in response to the second total constraint rule weight exceeding the first total constraint rule weight, one or more processors prohibit movement of the virtual machine from the second computer to the first computer and move the input data from the first computer to the second computer.

As described in block 314, one or more processors then selectively moves either the virtual machine to the first computer or the input data to the second computer based on constraint rules from the first set of constraint rules and the second set of constraint rules. For example, one or more processors may determine a cost of moving the input data from the first computer to the second computer. This cost may be monetary (i.e., how much money will be spent in moving the input data due to network costs, computer time cost, etc.), or it may be in terms of how much bandwidth is required to move the input data from the first computer to the second computer, or it may be in terms of the amount of time required to move the input data from the first computer to the second computer, etc. In any situation, in response to determining that the cost of moving the input data from the first computer to the second computer exceeds a predetermined limit (in money, bandwidth, time, etc.), movement of the input data from the first computer to the second computer is prohibited, and one or more processors moves the virtual machine from the second computer to the first computer.

In one example, the decision of whether to migrate the input data or to migrate the virtual machine is dependent on the structure of the computer program (e.g., application software 206 shown in FIG. 2) that will be using the input data 210 as inputs. For example, assume that one or more processors identifies how many checkpoints are in application software 206. A checkpoint is defined as a sequence of instructions within the application software that record the status of execution. This status is used 1) to restart the program at a later time if there is an execution fault, or 2) as a way to check intermediate results of code execution. For example, a checkpoint can be made at every tenth line of code to ensure that the outputs are in an expected format/range/etc. If not, then an error is assumed to have occurred upstream in the execution process. Thus, in this example, in response to determining that the quantity of checkpoints in the computer program exceeds a predetermined limit, movement of the virtual machine from the second computer to the first computer is prohibited by one or more processors, which therefore move the input data from the first computer to the second computer. That is, assume that the checkpoints are being checked/monitored by software within the second computer. If too many (more than a predetermined quantity) checkpoints are repeatedly checked by the monitoring software within the second computer, this would make processing by the virtual machine at the first computer slow and impractical. Thus, in this embodiment it is more efficient to move the input data to the virtual machine rather than moving the virtual machine to the input data.

The process ends at terminator block 316.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of allocating computer processing work, the method comprising:
    identifying, by one or more processors, an input data that is stored in a first computer for processing by a computer program;
    identifying, by the one or more processors, a virtual machine that is capable of executing the computer program, wherein the virtual machine is stored in a second computer;
    identifying, by the one or more processors, a first set of constraint rules against moving the input data from the first computer;
    identifying, by the one or more processors, a second set of constraint rules against moving the virtual machine from the second computer;
    assigning, by the one or more processors, a weight to each constraint rule within the first set of constraint rules and the second set of constraint rules;
    identifying, by the one or more processors, which one or more constraint rules within the first set of constraint rules applies to the input data and which one or more constraint rules within the second set of constraint rules applies to the virtual machine;
    summing, by the one or more processors, the weight of all constraint rules that apply to the input data to generate a first total constraint rule weight;
    summing, by the one or more processors, the weight of all constraint rules that apply to the virtual machine to generate a second total constraint rule weight; and
    in response to the first total constraint rule weight exceeding the second total constraint rule weight, prohibiting movement of the input data from the first computer to the second computer and moving, by the one or more processors, the virtual machine from the second computer to the first computer.

2. The computer-implemented method of claim 1, further comprising:
    determining, by the one or more processors, that at least one constraint rule from the first set of constraint rules absolutely prohibits moving the input data from the first computer; and
    in response to determining that the at least one constraint rule from the first set of constraint rules absolutely prohibits moving the input data from the first computer, moving, by the one or more processors, the virtual machine to the first computer.

3. The computer-implemented method of claim 1, further comprising:
    determining, by the one or more processors, a cost of moving the input data from the first computer to the second computer; and
    in response to determining that the cost of moving the input data from the first computer to the second computer exceeds a predetermined limit, prohibiting movement of the input data from the first computer to the second computer and moving, by the one or more processors, the virtual machine from the second computer to the first computer.

4. The computer-implemented method of claim 3, wherein the cost is monetary.

5. The computer-implemented method of claim 3, wherein the cost is in terms of bandwidth required to move the input data from the first computer to the second computer.

6. The computer-implemented method of claim 3, wherein the cost is in terms of time required to move the input data from the first computer to the second computer.

7. The computer-implemented method of claim 1, further comprising:
    identifying, by the one or more processors, a quantity of checkpoints in the computer program; and
    in response to determining that the quantity of checkpoints in the computer program exceeds a predetermined limit, prohibiting movement of the virtual machine from the second computer to the first computer and moving, by the one or more processors, the input data from the first computer to the second computer.

8. The computer-implemented method of claim 1, further comprising:
    in response to the second total constraint rule weight exceeding the first total constraint rule weight, prohibiting movement of the virtual machine from the second computer to the first computer and moving, by the one or more processors, the input data from the first computer to the second computer.

9. The computer-implemented method of claim 1, further comprising:
in response to determining that hardware resources in the first computer are incapable of supporting the virtual machine, prohibiting movement of the virtual machine from the second computer to the first computer and moving, by the one or more processors, the input data from the first computer to the second computer.

10. A computer program product for allocating computer processing work, the computer program product comprising a non-transitory computer readable storage medium having program code embodied therewith, the program code read and executed by one or more processors to perform a method comprising:
identifying an input data that is stored in a first computer for processing by a computer program;
identifying a virtual machine that is capable of executing the computer program, wherein the virtual machine is stored in a second computer;
identifying a first set of constraint rules against moving the input data from the first computer;
identifying a second set of constraint rules against moving the virtual machine from the second computer;
assigning a weight to each constraint rule within the first set of constraint rules and the second set of constraint rules;
identifying which one or more constraint rules within the first set of constraint rules applies to the input data and which one or more constraint rules within the second set of constraint rules applies to the virtual machine;
summing the weight of all constraint rules that apply to the input data to generate a first total constraint rule weight;
summing the weight of all constraint rules that apply to the virtual machine to generate a second total constraint rule weight; and
in response to the first total constraint rule weight exceeding the second total constraint rule weight, prohibiting movement of the input data from the first computer to the second computer and moving the virtual machine from the second computer to the first computer.

11. The computer program product of claim 10, further comprising program code that is readable and executable by the one or more processors to:
determine that at least one constraint rule from the first set of constraint rules absolutely prohibits moving the input data from the first computer; and
in response to determining that the at least one constraint rule from the first set of constraint rules absolutely prohibits moving the input data from the first computer, move the virtual machine to the first computer.

12. The computer program product of claim 10, further comprising program code that is readable and executable by the one or more processors to:
determine a cost of moving the input data from the first computer to the second computer; and
in response to determining that the cost of moving the input data from the first computer to the second computer exceeds a predetermined limit, prohibit movement of the input data from the first computer to the second computer and move the virtual machine from the second computer to the first computer.

13. The computer program product of claim 10, further comprising program code that is readable and executable by the one or more processors to:
identify a quantity of checkpoints in the computer program; and
in response to determining that the quantity of checkpoints in the computer program exceeds a predetermined limit, prohibit movement of the virtual machine from the second computer to the first computer and move the input data from the first computer to the second computer.

14. The computer program product of claim 10, further comprising program code that is readable and executable by the one or more processors to:
in response to the second total constraint rule weight exceeding the first total constraint rule weight, prohibit movement of the virtual machine from the second computer to the first computer and move, by the one or more processors, the input data from the first computer to the second computer.

15. The computer program product of claim 10, further comprising program code that is readable and executable by the one or more processors to:
in response to determining that hardware resources in the first computer are incapable of supporting the virtual machine, prohibit movement of the virtual machine from the second computer to the first computer and move the input data from the first computer to the second computer.

16. A computer system comprising:
one or more processors, one or more computer-readable memories, one or more computer-readable storage devices, and program instructions stored on at least one of the one or more computer-readable storage devices for execution by at least one of the one or more processors via at least one of the one or more computer-readable memories, the program instructions comprising:
first program instructions to identify an input data that is stored in a first computer for processing by a computer program;
second program instructions to identify a virtual machine that is capable of executing the computer program, wherein the virtual machine is stored in a second computer;
third program instructions to identify a first set of constraint rules against moving the input data from the first computer;
fourth program instructions to identify a second set of constraint rules against moving the virtual machine from the second computer;
fifth program instructions to assign a weight to each constraint rule within the first set of constraint rules and the second set of constraint rules;
sixth program instructions to identify which one or more constraint rules within the first set of constraint rules applies to the input data and which one or more constraint rules within the second set of constraint rules applies to the virtual machine;
seventh program instructions to sum the weight of all constraint rules that apply to the input data to generate a first total constraint rule weight;
eighth program instructions to sum the weight of all constraint rules that apply to the virtual machine to generate a second total constraint rule weight; and
ninth program instructions to, in response to the first total constraint rule weight exceeding the second total constraint rule weight, prohibit movement of the input data from the first computer to the second computer and moving the virtual machine from the second computer to the first computer.

17. The computer system of claim 16, further comprising:

eleventh program instructions to determine that at least one constraint rule from the first set of constraint rules absolutely prohibits moving the input data from the first computer; and twelfth program instructions to, in response to determining that the at least one constraint rule from the first set of constraint rules absolutely prohibits moving the input data from the first computer, move the virtual machine to the first computer.

18. The computer system of claim 16, further comprising:

eleventh program instructions to determine a cost of moving the input data from the first computer to the second computer; and twelfth program instructions to, in response to determining that the cost of moving the input data from the first computer to the second computer exceeds a predetermined limit, prohibit movement of the input data from the first computer to the second computer and move the virtual machine from the second computer to the first computer.

19. The computer system of claim 16, further comprising:

eleventh program instructions to identify a quantity of checkpoints in the computer program; and twelfth program instructions to, in response to determining that the quantity of checkpoints in the computer program exceeds a predetermined limit, prohibit movement of the virtual machine from the second computer to the first computer and move the input data from the first computer to the second computer.

20. The computer system of claim 16, further comprising:

eleventh program instructions to, in response to determining that hardware resources in the first computer are incapable of supporting the virtual machine, prohibit movement of the virtual machine from the second computer to the first computer and move the input data from the first computer to the second computer.

* * * * *